United States Patent Office 2,780,310
Patented Feb. 5, 1957

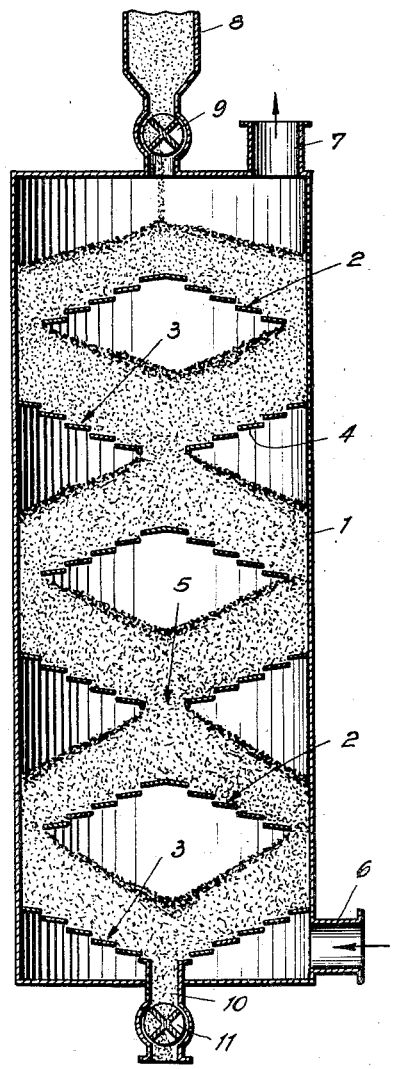

2,780,310

PURIFICATION OF GASES WITH SHAPED PURIFYING MATERIALS

Franz Schaub, Oberhausen-Holten, Germany, assignor to Ruhrchemie Aktiengesellschaft, Oberhausen-Holten, Germany, a corporation of Germany Application November 1, 1951, Serial No. 254,261

Claims priority, application Germany November 8, 1950

2 Claims. (Cl. 183—114.2)

This invention relates to improvements in the purification of gases with shaped purifying materials. It more particularly relates to a method for removing sulfur and other impurities from gases with conventional shaped, and particularly spherical gas purifying materials.

The use of shaped gas purifying materials such as sperical gas purifying materials are known for the removal of sulfur and other impurities from gases, as, for example, the removal of cyanogen compounds. These materials are conventionally passed downwardly through the customary gas purifier so that the upwardly passing gases flow through them. This purification method is customarily effected with gas velocities which are so small that with the conventional grain sizes of the shaped material, the downward pressure of the purifying material is not reduced for all practical purposes by the flow of the gases. In the case of greater layer thicknesses, the lower layers of the shaped gas purifying materials are accordingly under a pressure which may possibly be very high. This results in high mechanical stresses on the shaped purifying material and thus a considerable tendency toward abrasion and disintegration thereof. The preparation of a shaped purifying material which is sufficiently strong and abrasion-resistant and which at the same time also has a good absorption power for sulfur compounds and other gas impurities, generally offers insurmountable difficulties.

One object of this invention is the purification of gases with shaped gas purifying materials without the aforementioned difficulties. This and still further objects will become apparent from the following description:

It has now been found that the chemical purification of gases, such as the removal of sulfur, can be effected in an excellent manner with shaped purifying materials having relatively low strength, abrasion resistance and stability of shape. This is effected by passing gases to be purified through the layers of purifying material with such a high velocity that the downward pressure and the weight of the shaped purifying material is extensively, and possibly almost completely, counteracted without the downward motion of the main portion of the purifying material being impeded. In this manner the abrasive pressure is correspondingly reduced. Furthermore, the superimposed layers of purifying material are so effectively loosened from each other that no crushing of the shaped particles of the material will take place. Under these conditions the chemical purification of gases, and especially the removal of sulfur therefrom, can be carried out even with shaped purifying materials having relatively low strength.

The upward velocity of the gases to be treated should not be increased to such an extent that the downward motion of the shaped purifying material as a whole is substantially impeded. The shaped purifying material should thus be allowed to pass downward so that it can continuously be passed through the purifying apparatus. Dust-like portions of the purifying material are carried and discharged with the flowing gases. In this connection, however, fine granular portions of the purifying material which are present may be caused to rotate.

It has been found particularly advantageous if the gas-purifying material is shaped in such a uniform manner that, starting with a given gas velocity, the downward pressure, due to the weight of the downwardly travelling grains of material, is uniformly and if possible practically completely counteracted. This does not prevent individual particles of the material in the loosened layer from being imparted a predominantly rotary motion within the boundary defined by the neighboring particles. In spite of this, the abrasion of the individual particles against each other is so small that it may be considered negligible.

In direct contrast to the gas purification methods which were conventionally used, the new method according to the present invention, uses relatively high gas velocities. Due to this it may be necessary to connect a plurality of purifying apparatuses in series, one after the other, in order to obtain a sufficiently long time of action for the purification. The shaped purifying material may in this case be passed consecutively through the series-connected apparatuses. The high velocities used in accordance with the invention, however, have the advantage of a considerably better exchange of material, so that in principle the required time of action decreases. The gas velocities which are used must be selected on the basis of the grain size of the purifying material, and, as mentioned, in order to assure a sufficient degree of purification, a plurality of purifying apparatus may have to be connected in series, one after the other.

If purifying sections which are series-connected, one after the other, are used, they may be arranged alongside or above one another. A tower arrangement of individual purification stages is particularly advantageous because in this case the movement of the purifying masses may take place under the action of their own weight, and furthermore, the removal of the exhausted material does not offer any difficulties.

The exhausted purifying material may be regenerated in any conventional manner as, for example, by extraction or oxidation, in which connection high gas velocities may also be used in accordance with the present invention. The purified materials may then be returned for recycling to the method and are again used for the gas treatment.

It has been found particularly advisable to pass the purifying material used in connection with the gas purification or regeneration through containers in which the granular material is first of all caused to flow downward over a conically shaped false bottom provided with gas passages therethrough and extending almost to the side wall of the treating container. As the material reaches the edges of this conical false bottom, it drops onto an underlying funnel-shaped false bottom which is also provided with gas passages therethrough. The funnel-shaped false bottom extends to the side walls of the container and is provided with a central opening for the passage of the granular material therethrough. The granular material will thus flow over the funnel-shaped false bottom and out through the center opening thereof. After passing through the center of the funnel-shaped false bottom, the granular material may be passed over similar alternating conical and funnel-shaped false bottoms until the purifying material is exhausted. Each individual conical or funnel-shaped false bottom may be defined by multiple annular grid plates of increasing diameter positioned to define a space between each adjacent annular grid plate.

The gases to be purified enter at the lower end of the container and flow consecutively through the individual layers of material. In this way the granular mass repeatedly comes into contact with the gases to be purified in countercurrent flow relationship. On the individual false bottoms, due to the partial counteracting of the weight of the material by the gas flow, there is a very favorable flowing of the gas-purifying material and a particularly flat angle of flow which assures a favorable interaction between the solid and gaseous constituents without the purifying material being carried along by the gas flow or prevented from discharging at the bottom.

It is particularly advantageous if the purifying material has an average granular size of 5 to 10 mm. In this case the gases should be purified with an average gas velocity of 20 to 80 cm. per second. In this manner there is obtained a sufficient loosening of the purifying material in a very favorable interaction.

Methods are known for the removal of sulfur from gases in which finely granular desulfurization materials act in a freely suspended state within the gas chamber on the gas atmosphere. The extremely fine, generally dust-like desulfurization materials are distributed within the gas flow by the flow energy of the gases to be purified. Finely granular desulfurization materials have to be introduced into the gases to be purified by gravity drop. In such methods, however, it is very difficult to obtain a suitable counterflow between the purifying material and the gas. Furthermore, finely granular desulfurization materials have the disadvantage that the gas becomes charged with their dust so that desulfurization must be followed by a removal of this dust from the gas in order to obtain a sufficiently purified and dust-free gas. This removal generally is rather cumbersome and difficult to effect.

These disadvantages are avoided by the method in accordance with the present invention which in addition does not require any cumbersome arrangement for the effecting thereof.

The process in accordance with the invention may be carried out, for example, by means of a device shown on the drawing in the form of a vertical longitudinal section.

Conically shaped intermediate bottoms 2 and funnel-shaped intermediate bottoms 3 are alternately arranged in the interior of a closed tower-like container 1. These intermediate bottoms consist of individual rings 4 which are arranged in the form of a grate. The conically shaped intermediate bottoms 2 do not extend to the inner wall of the tower-like container 1 thus permitting the granular purifier mass to pass over at the outer edges of these intermediate bottoms on the subjacent funnel-shaped intermediate bottom. The funnel-shaped intermediate bottoms are provided with central openings 5 through which the material passes to the next conically shaped intermediate bottom.

The gases to be purified are introduced through a tubular nozzle 6. Starting from the lower end of container 1, the gases flow consecutively through the layers of the granular desulfurizing material travelling down over the individual conically shaped and funnel-shaped intermediate bottoms. At the top of the equipment the gases purified are led off through a pipe 7.

The granular desulfurizing material is in a storage container 8 and is charged, in the prescribed proportion, to the uppermost conically shaped intermediate bottom by means of a pocket feeder 9. At the lowermost conically shaped intermediate bottom, the granular material, sufficiently laden with sulfur, falls into a chamber 10, from which it is continuously discharged by a pocket discharger 11.

The rate of charge and the rate of discharge of the granular desulfurizing material must be adjusted to one another in such a manner as to have a sufficient deep layer of the granular desulfurizing material travelling down on the individual intermediate bottoms. Moreover, the rate of flow of the desulfurizing material must be adjusted in connection with the rate of flow of the gases in such a way as to obtain utilization of the desulfurizing material as complete as possible.

All moldable materials or mixtures of materials which are used in the gas purification for the desulfurization of gases are suitable for the preparation of the granular materials. Of particular effectiveness are materials of iron oxide which contain larger quantities of alkali hydroxide or alkali carbonate and, if necessary, constituents which increase the strength of the shaped material. These desulfurizing materials may be molded in any shape, for example in balls, polygonal bodies, pastils, small cylinders, etc.

*Example*

A round cylindrical purifying apparatus having an inside diameter of 200 centimeters and a height of 20 meters was used for the purification of 9000 m.$^3$/hr. of coke oven gas containing 4 gms./m.$^3$ of inorganic sulfur compounds. A total of 20 intermediate bottoms were installed within this apparatus, ten of these bottoms consisting of annular plates arranged in the form of a cone and ten of them consisting of annular plates arranged in the form of a funnel.

200 kgs./hr. of oxidic iron ore of an average granular size of 8 mm. were charged at the upper end of the apparatus by means of a pocket feeder. Maximum grain size was 10 mm. and minimum grain size was 6 mm. diameter. Average layer depth of the granular material on the individual intermediate bottoms was 60 cm.

The 9000 m.$^3$ of coke oven gas to be purified per hour were fed, at a temperature of 25° C., at the lower end of the apparatus. In the passage through the layers of the downwardly travelling granular desulfurizing material the sulfur content of the gas decreased so far that, at the upper end of the apparatus, a gas passed out which contained only 0.01 gm./m.$^3$ of inorganic sulfur compounds. Due to the partial counteracting of the weight of the material by the gases passed through, the granular materials moved uniformly from the uppermost to the lowermost intermediate bottom. No eddying condition of the desulfurizing material in the manner of a "fluidized" bed occurred.

I claim:

1. In a method in which sulfur is removed from a gas by contact of the gas with a molded desulfurization material, the improvement which comprises establishing a substantially vertical contact zone, substantially continuously passing such a molded, desulfurization material having a grain size of about 5–10 mm. downward through said zone in the form of a substantially steadily downwardly moving non-eddying gravity bed, passing said desulfurization material over at least one downwardly inclined material support surface in said zone, said material support surface allowing the passage of gas therethrough, and substantially continuously passing a sulfur-containing gas to be desulfurized upward through said zone and said material support surface in counter-current flow contact with said material at a flow velocity of about 20–80 cm. per second, said flow velocity being sufficient to substantially reduce the downward pressure and weight of said material without substantially impeding the downward flow thereof and without causing eddying.

2. Improvement according to claim 1 in which said desulphurization material is passed downwardly through said zone over alternate conical shaped downwardly inclined and funnel shaped material support surfaces which will allow the upward passage of gas therethrough.

References Cited in the file of this patent

UNITED STATES PATENTS

| | | |
|---|---|---|
| 271,604 | Cook | Feb. 6, 1883 |
| 1,547,924 | Kerschbaum | July 28, 1925 |

(Other references on following page)

UNITED STATES PATENTS

| Number | Name | Date |
|---|---|---|
| 1,672,778 | Raffloer | June 5, 1928 |
| 1,702,311 | Pantenburg | Feb. 19, 1929 |
| 1,900,667 | Raffloer | Mar. 7, 1933 |
| 2,361,151 | Reed | Oct. 24, 1944 |
| 2,364,453 | Laying et al. | Dec. 5, 1944 |
| 2,384,311 | Kearby | Sept. 4, 1945 |
| 2,389,493 | Evans | Nov. 20, 1945 |
| 2,444,128 | Anderson | June 29, 1948 |
| 2,476,472 | Arnold et al. | July 19, 1949 |
| 2,526,701 | Shirk | Oct. 24, 1950 |
| 2,579,678 | Kuhn | Dec. 25, 1951 |
| 2,581,134 | Odell | Jan. 1, 1952 |
| 2,584,296 | Scheeline | Feb. 5, 1952 |
| 2,621,112 | Schmalenbach | Dec. 9, 1952 |

FOREIGN PATENTS

| Number | Country | Date |
|---|---|---|
| 364,762 | Great Britain | Jan. 14, 1932 |
| 463,246 | Great Britain | Mar. 22, 1937 |